United States Patent [19]

Washington

[11] Patent Number: 5,078,455
[45] Date of Patent: Jan. 7, 1992

[54] DIFFERENTIAL PRESSURE REGULATOR QUICK RELEASE VALVE IN A PNEUMATIC BRAKING SYSTEM

[76] Inventor: William E. Washington, P. O. Box 17348, Denver, Colo. 80217

[21] Appl. No.: 365,978

[22] Filed: Jun. 14, 1989

[51] Int. Cl.$^5$ .................................. B60T 17/00
[52] U.S. Cl. ................................. 303/69; 303/87
[58] Field of Search ........... 303/69, 87, 68; 138/30, 138/31, 40

[56] References Cited

U.S. PATENT DOCUMENTS

| | | | |
|---|---|---|---|
| 2,040,580 | 5/1936 | Vorech | 303/69 X |
| 2,718,897 | 9/1955 | Andrews | 303/69 X |
| 3,093,153 | 6/1963 | Horowitz | 303/69 X |
| 3,424,185 | 1/1969 | Lansky et al. | 303/69 X |
| 4,166,655 | 9/1979 | Spero | 303/87 |

Primary Examiner—Douglas C. Butler

[57] ABSTRACT

This invention relates to release/relief valves, trailer brake release valve, and apparatus for equalizing pressure and absorbing shock, as they pertain to pneumatic brake systems for buses, trucks, and trucks/semi-trailers, singular and in multiple combinations in automotive air brake installations; and more particularly to a differential pressure regulator quick release valve that employs a dilivery channel for directing and centralizing fluid pressure differentials to its base housing and the same delivery channel directing the exhaust of fluid pressure to its quick release ports.

16 Claims, 10 Drawing Sheets

DIFFERENTIAL PRESSURE REGULATOR QUICK RELEASE VALVE IN A PNEUMATIC BRAKING SYSTEM

In pneumatic/fluid pressure air braking systems it is customary to install a quick release valve, or other type trailer brake release valve, between the brake actuator chambers on the respective axles of buses, trucks and truck/trailer combinations.

One such quick release valve is disclosed in the patent of Stephen Vorech, U.S. Pat. No. 2,040,580, dated May 12, 1936, and comprises a flexible diaphragm which is effective to not only direct the application of compressed air to the brake actuators, but to also secure a quick release of air pressure from such chambers when the master control valve is moved to the brake release position. Another such type of valve is disclosed in the patent of Earl T. Andrews, U.S. Pat. No. 2,718,897, dated Sept. 27, 1955, and comprises a spring acting upon the diaphragm in such a manner that a pressure differential exists across the diaphragm and this feature results in somewhat slower application of fluid pressure to the brake actuators.

One such trailer brake release valve is disclosed in the patent of Joseph L. Cannella, U.S. Pat. No. 3,512,843, dated May 19, 1970, and illustrated in the same as being electrically operated and connected by a conduit to the relay valve, said relay valve being connected by conduits respectively to brake actuators.

One such apparatus for equalizing and absorbing shock is disclosed in the patent of Theodore P. Spero, U.S. Pat. No. 4,166,655 dated Sept. 4, 1979, and comprises a resilient, yieldable, shock-absorbing member contained within an elongated walled housing and bordering on one end by a top side cavity wall and on the other end by a piston whose bottom side is sealed by a diaphragm member to prevent the cavity from being contaminated by water droplets and particulates. This apparatus for equalizing pressure and absorbing shock as further disclosed in the patent is installed to one side of a quick release valve which is installed between two opposing brake actuators to prevent single wheel lock-up in a pneumatic braking system.

The device described by Vorech employs the use of a flexible diaphragm member whose effectiveness for controlling the application of compressed fluid to brake actuators is dependent upon pressure differentials. These same differentials create a situation in compressed fluid flow called destructive interference and are responsible for the adverse occurrence of single wheel lock-up during the braking process. In this regard, that which the valve needs to function also causes degeneration in braking ability.

The device described by Andrews employs the use of a spring acting upon a diaphragm in such a manner that a pressure differential exists across the diaphragm, and this feature results in somewhat slower application of the front brakes as compared with the rear brakes and causing a lesser energization of the front brakes than that of the rear brakes. This device causes a purposeful time and application differential with the negative effect of unbalanced front-to-back braking and uneven front-to-back wear on brake components, with the back brakes wearing prematurely to the front brakes. Also, as the braking ability of the front brakes is diminished, the ideal stopping distance is increased.

The device described by Cannella is electrically activated by a switch attached to the foot pedal control valve and upon release of the foot pedal, the switch directs electrical energy through a time-delay switch and then said electrical energy is transmitted to the electrical trailer brake release valve connected to the relay valve by a conduit and releasing the fluid pressure contained within the conduit connected to the relay valve for the purpose of eliminating the sluggish exhaust of air pressure from a plurality of brake chambers. The sluggish exhaust of the plurality of brake actuators is more a result of the actuators' fluid volume being exhausted through a single relay valve exhaust port. Cannella's device also lacks the design to address the fluid pressure wave front that so readily travels through the relay valve crossing to and from opposing brake actuators and causing single wheel lock-up.

The device described by Spero, an apparatus for equalizing pressure and absorbing shock in a pneumatic braking system configured with a walled, contained, two-chamber housing having an elongated, resilient, yieldable member on the top end and a rigid piston on the bottom in the upper chamber separated by a resilient covering to prevent contamination forming a divider for a second lower chamber has been discovered to have negative effects on the brake system. It was found that as the piston is acted upon by fluid pressure, said piston deforming the elongated member and having the result of energization of said member, upon release of the fluid pressure the piston becomes a projectile traveling into the second lower chamber causing physical damage to the dividing resilient member, the result being contamination of the upper chamber and inconsistent equalizing of pressure and an inability to absorb shock. Another result being the fluid pressure volume would cause the damaged divider member to enter the outlet port, clogging the conduit and preventing fluid pressure from flowing to the brake actuator. These consequences are entirely due to the piston's lack of an established point of rest.

Still another consequence of the apparatus is that its location to one side of a quick release valve lessens its ability to absorb shock occurring from the fluid pressure application density wave front that results from supersonic compressed fluid flow. The density wave front travels first through the source supply inlet port of the quick release valve where the density wave front divides, causing a shock, and travels simultaneously through opposing laterally aligned outlet ports, one to a brake actuator and the other through the apparatus and then to the opposing brake actuator. As the initial shock occurs in the quick release valve and not in the apparatus, the apparatus cannot absorb the shock and the ideal braking effectiveness is diminished.

One of the objects of the present invention, and also an improvement over the quick release valve, is the present invention's ability to utilize the destructive interference qualities of compressed fluid flow and create constructive interference conditions to eliminate single wheel lock-up by incorporating a delivery channel whose properties isolate the fluid mechanics of the quick release function from the equalizing function of the base chamber delivery system.

Another object of the present invention, and an improvement over all quick release valves, is to provide a valve of the type whose functions eliminate the degenerative effect created by the front-to-back braking time differential, as the ideal braking situation is to have balance throughout the plurality of brake actuators.

Another object is to provide a valve that is an improvement over the apparatus for equalizing pressure and absorbing shock, and having the mechanism to absorb shock of compressed fluid flow at the point of said shock and to equalize pressure simultaneously during dynamic braking cycles with the appropriate design to insure consistent performance.

Yet another object is to provide a valve whose mechanisms provide for consistent performance, maintainability and reliability over a relatively long lifetime.

Still another object is to provide a valve whose exhaust/relief function does not cause sluggish release of fluid volume in plurality brake actuator designs but works mechanically as an integral part of the brake system design to insure quick release of fluid pressure volume between opposing actuators per axle in all vehicle axle configurations and is an improvement over the trailer brake release valve.

Still another object of the present invention is to provide a single valve whose performance exceeds those of the aforesaid patents with the improvements necessary to prevent the consequences cited of same said patents.

BRIEF DESCRIPTION OF THE DRAWINGS

In the drawings, wherein similar reference characters refer to similar parts throughout the several views.

DETAILED DESCRIPTION

Figure 1:
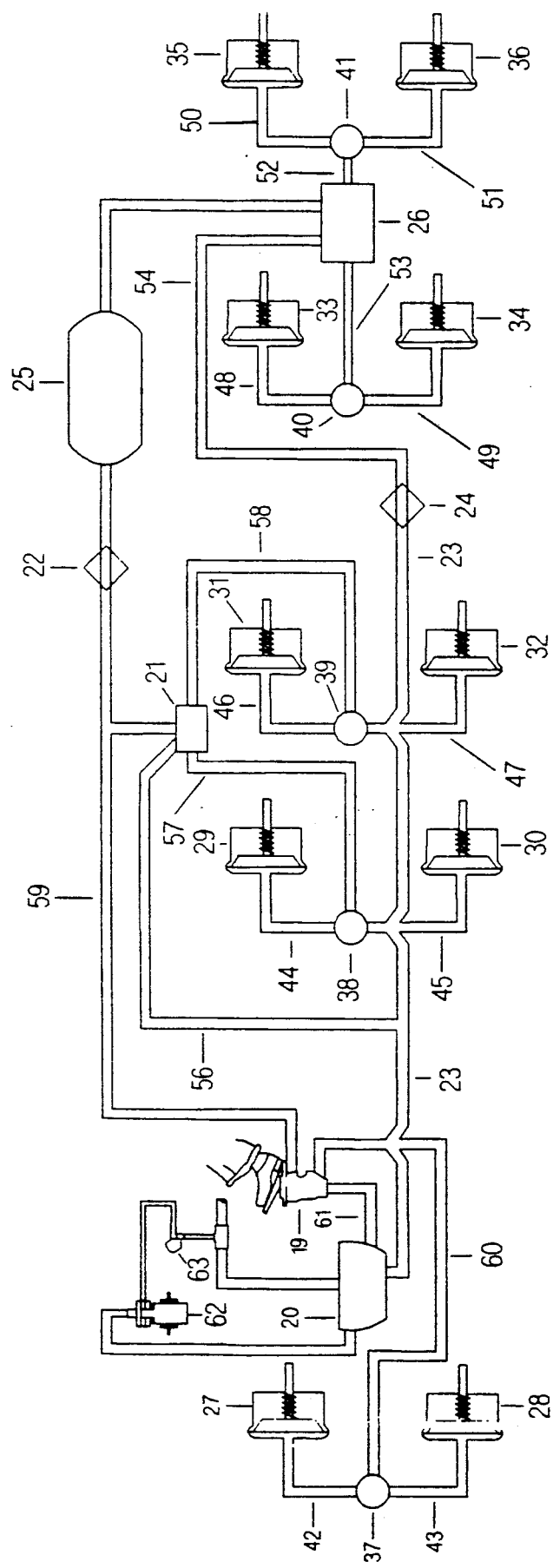
FIG. 1 is a diagrammatic view of a typical fluid pressure vehicle braking system for truck/semi-trailers having the novel differential pressure regulator quick release valve of the invention incorporated therein.

Referring more particularly to FIG. 1, the novel differential pressure regulator quick release valves of the present invention are illustrated therein in connection with a fluid pressure vehicle braking system of a well known type. Said braking system includes; a truck reservoir 20 supplied by a conventional compressor 62, a conventional governor 63 employed for controlling the operation of the compressor 62 in accordance with the pressure of the air within the reservoir 20, a reservoir 25 for the trailer, a treadle valve 19, opposing brake actuator chambers 27 and 28 (FIG. 9), 29 and 30, 31 and 32, 33 and 34, 35 and 36, a conventional relay valve 21, an emergency relay valve 26, glad hands 22 and 24 connecting the trailer/truck air brake systems. Also shown in FIG. 1 are the conduits 60, 57, 58, 52 and 53, whose purpose is to direct fluid pressure to the invention 37, 38, 39, 40, and 41 of the patent, and are interposed respectively between opposing brake actuators 27-36, and connected by conduits 42-51 for the purpose of directing the application of fluid pressure to and its exhaust from said brake actuators 27 and 28, 29 and 30, 31 and 32, 33 and 34, 35 and 36 in a manner that will appear more fully hereinafter.

Figure 2:
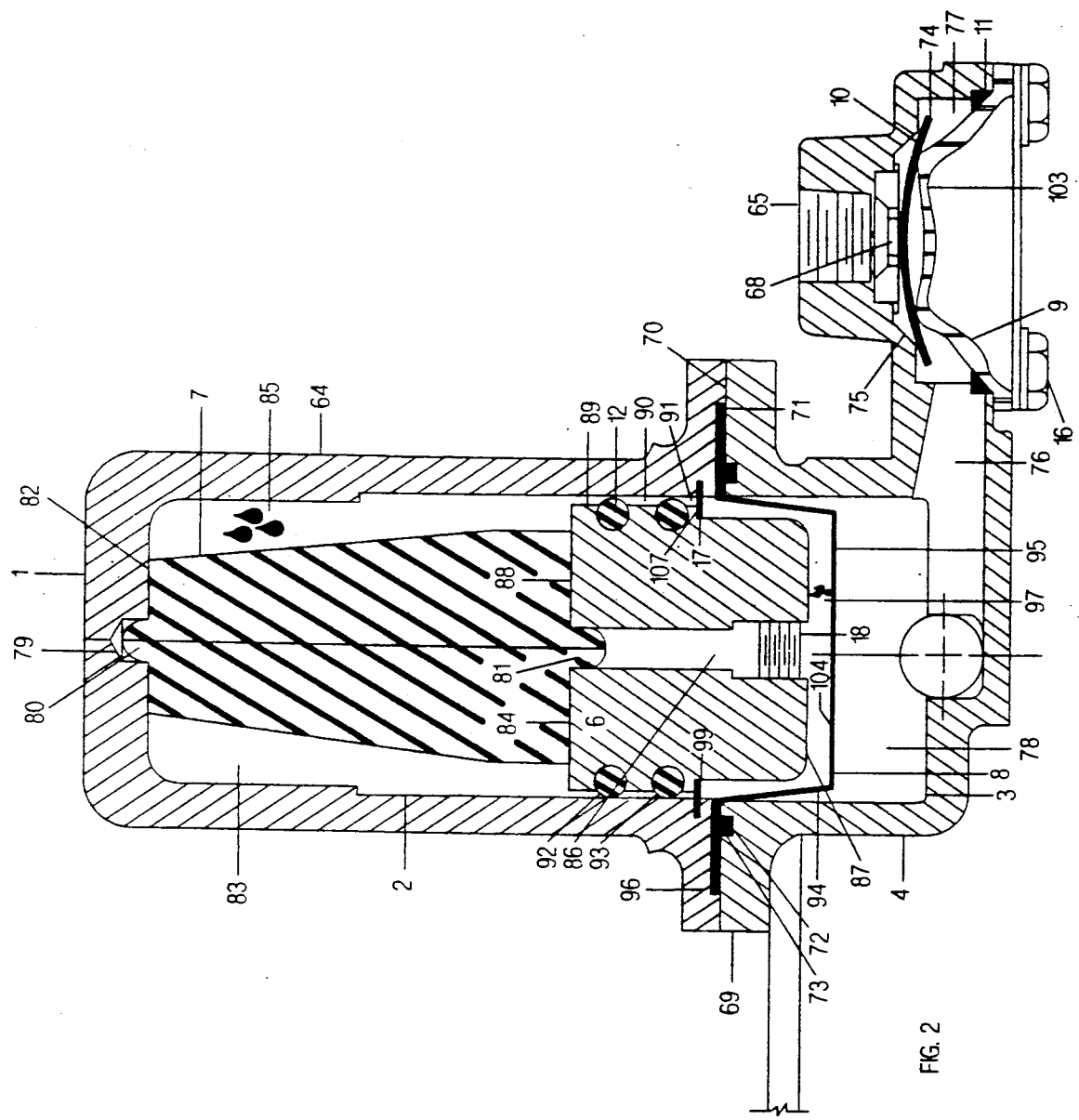
FIG. 2 is a detailed sectional view of the differential pressure regulator quick release valve.
Figure 3:
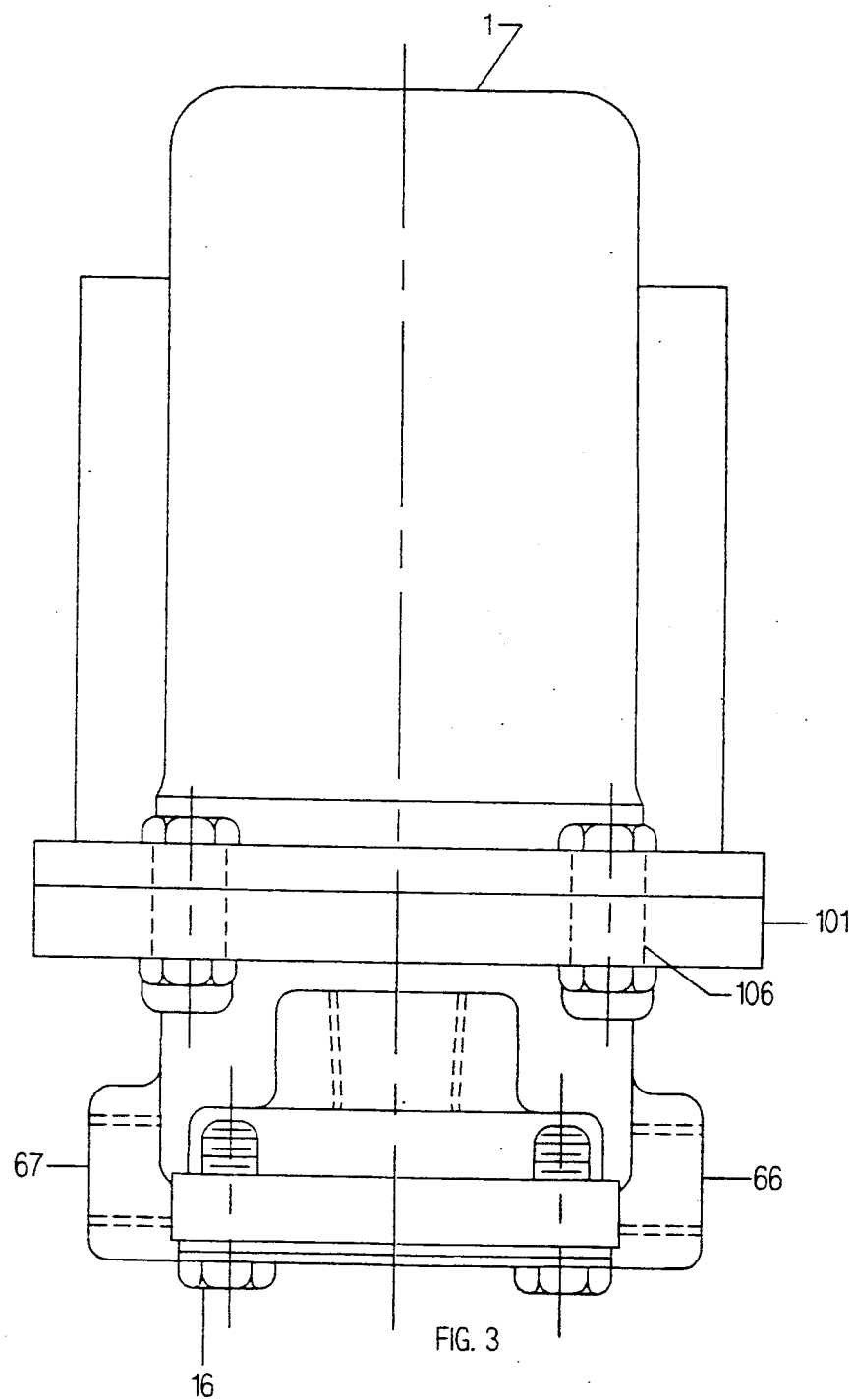
FIG. 3 is an external front view of the differential pressure regulator quick release valve.
Figure 9:
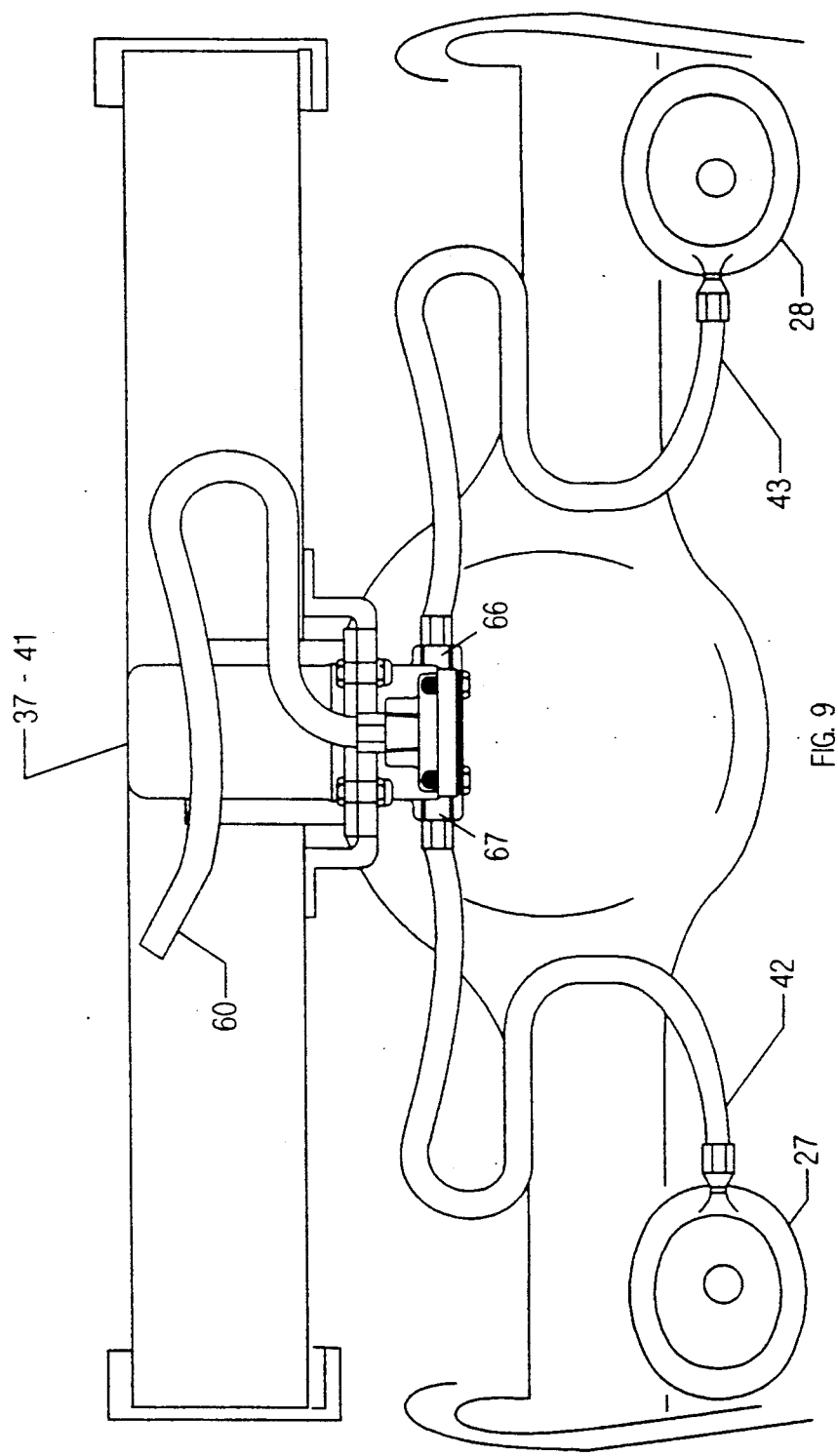
FIG. 9 is the differential pressure regulator valve in its operating position on the typical braking axle.

As shown in FIG. 2 the invention 64 includes a lower chamber base housing 4 having a protruded vertical inlet port 65 connected by conduits 60, 57, 58, 52 and 53 and two laterally aligned outlet ports 66 and 67 shown in FIG. 3 and FIG. 9, said outlet ports respectively connected to opposing brake actuators 27-36 by conduits 42-51. The base housing 4 whose composition of cast aluminum having density to maintain minimum of 150 psi for 60 seconds and has an inlet port 65 and machined diaphragm support 68 which is a safety screen to maintain position of the flexible quick release diaphragm 10 and having a stamped rigid quick release cover 9 for the purpose of exhausting the fluid pressure into the atmosphere. The flange upper wall 69 includes an upper surface 71 that is machined to mate with the corresponding surface of the cylinder housing flange wall surface 70 of the upper cylinder housing 1 having the same properties as the base housing 4 and said cylinder housing 1 that has an annular counterbore 72 therein for receiving the lip 73 of the covering base diaphragm 8 in a manner as will be later described in detail.

In order to insure a long life of the valve 64 and secure uniform action, the quick release diaphragm 10 is made of a suitable flexible material such as reinforced rubber or rubber composition and is free of any initial flexure or stress. The boundary edge 74 of the diaphragm 10 is resiliently maintained in engagement with inner surface seat 75 and thus controls communications between an inlet port 65 and a ported delivery channel 76. A cavity 77 whose diameter is machined sufficient to allow the unobstructed flexure of the quick release diaphragm 10 and whose other larger diameter is sized for the insertion of a square seal ring 11 to prevent fluid pressure seepage around the contact surface of the quick release cover 9 also having a formed concavity and is fastened to the base 4 by four locking screws 16, shown in FIG. 2 and FIG. 3, to secure the cover 9 to the base 4 is contained in the base housing protrusion. Thus in the normal position of the parts, the quick release cover 9 secured into the concavity 77 and maintaining the position of the seal ring 11 is fixing the location of the quick release diaphragm 10 between itself and the inner cavity surface seat 75 having the machined integral diaphragm screen support 68 at the opening from the inlet port 65 and allowing for the unrestricted communication of fluid pressure between the inlet port 65 and the delivery channel 76 and the outlet ports 66 and 67 to the brake actuators 27-36.

The upper walled cylinder housing 1 has an inner cylinder machined surface 2, a button bore 79, for receiving the top end button 80 of the tapered frustoconical formed shock absorber 7 having a button 81 axially aligned with the button 80 in centrally oriented positions and seated against the inner cylinder top wall 82. This is to maintain uniformity of space around the member 7. The member 7 is comprised of appropriate resilient elastomeric compounds and serves to compress moving axially and deform filling the upper chamber 83 when a force is applied to its face 84 thus energizing and reshaping to its original form at termination of said force. The shock absorber 7 is formulated to a predetermined hardness sufficient to maintain energizations relative to the pressure differentials existing during the fluid pressure application.

Eight cc's of 10 weight non-detergent hydraulic oil 85 is dispensed inside the upper cylinder housing 1 for the purpose of aiding the shock dampening process and whose composition and operation is such that it exceeds the ambient temperature ranges to which brake systems are subjected. The piston 6 has a centerbore 86 through the vertical center axis and is threaded through the bottom end horizontal portion face 87 to receive a hex socket screw 18 and being generally solid and having a top end horizontal face 88 to receive the shock absorber button 81 in the centerbore 86 with a piston wall surface 89, two counterbores 92 and 93 of a curved nature in the piston wall 89 and separated by two intermediate flange portions 90 and 91 having identical dimensions and whose diameter is slightly less than that of the inner cylinder surface 2 to insure a snug fit of the piston 6 is disposed in the cylinder 83.

Figure 6:
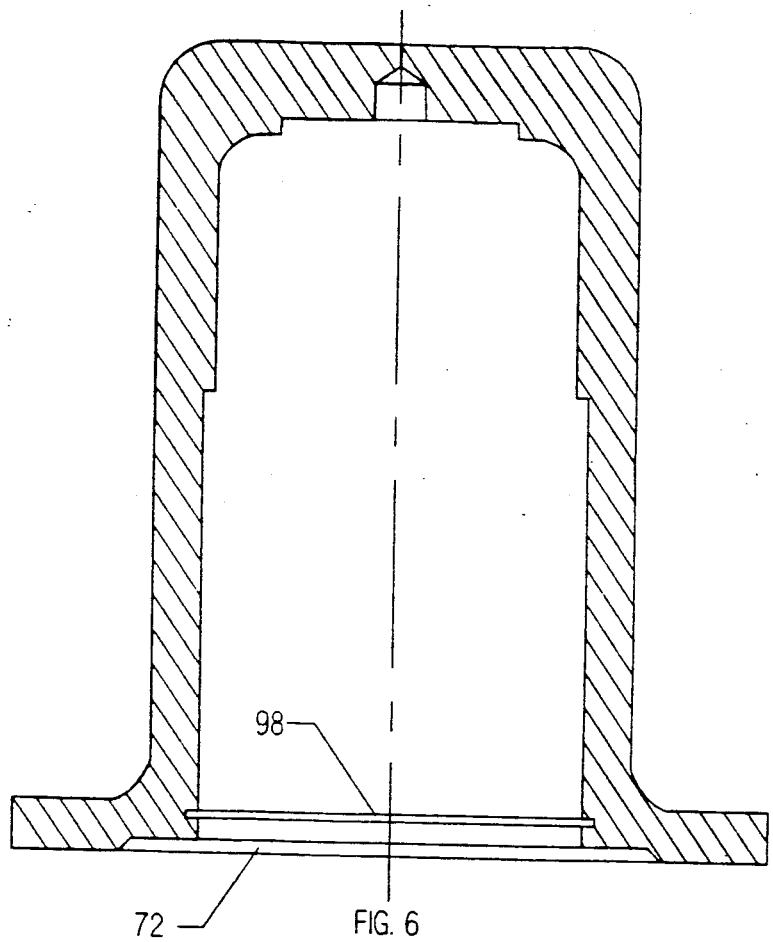
FIG. 6 is diagrammatic sectional view of the upper cylinder housing.
Figure 10:
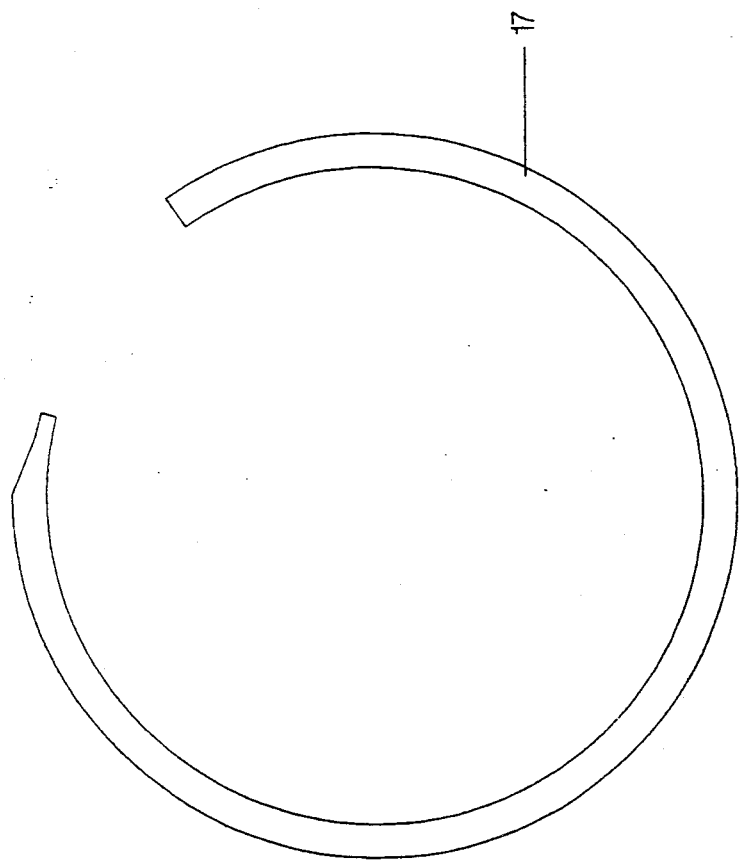
FIG. 10 is a topical view of the retaining ring.

A retaining ring 17 is inserted into a grooved track 98 shown in FIG. 6 in the cylinder inner surface 2 making contact, without pressure, to the underside lip 99 of the piston bottom flange 107. The retaining ring 17 shown in FIG. 10 establishes the piston's 6 position of rest to insure consistent reactions to differential fluid pressures. An O-ring 12 is dispensed in each of the counterbores 92 and 93 and serves to form an airtight seal between the piston 6 and the cylinder surface 2 and also serves to roll axially within the counterbores 92 and 93 when a fluid pressure force is present. A quantity of oil 97 is spread over the end portion of the face 87 of the piston 6 and serves as lubrication for the base diaphragm's 8 inner surface 104 during fluid pressurizations.

The base diaphragm 8 is comprised of a resilient elastomeric material impervious to winterizing alcohol and maintaining its function to pressures of 1000 psi and has a shape suitable to covering the piston 6 with a minimum clearance between the respective ports 66 and 67 without making contact with the piston 6. The base diaphragm 8 has a flares side wall 94, an end wall 95, and an annular flange 96 having an annular lip 73 that engages the counterbore 72 that serves to seal airtight the piston 6, shock absorber 7 and the oil 85 of the upper chamber 83 from the contaminants or particulates contained within the fluid pressure transmitted through the lower chamber 78.

Figure 4:
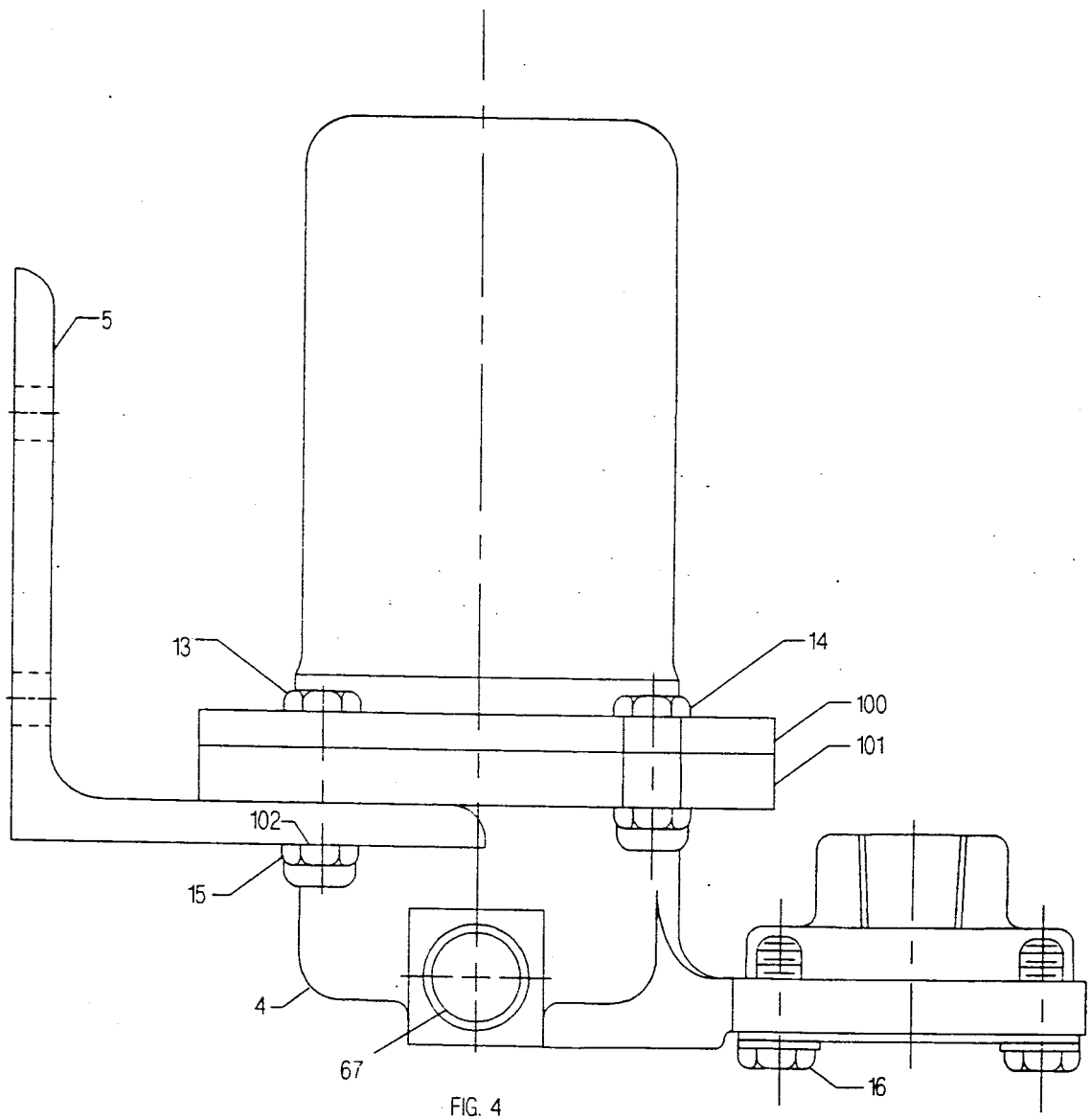
FIG. 4 is an external side view of the differential pressure regulator quick release valve.
Figure 7:
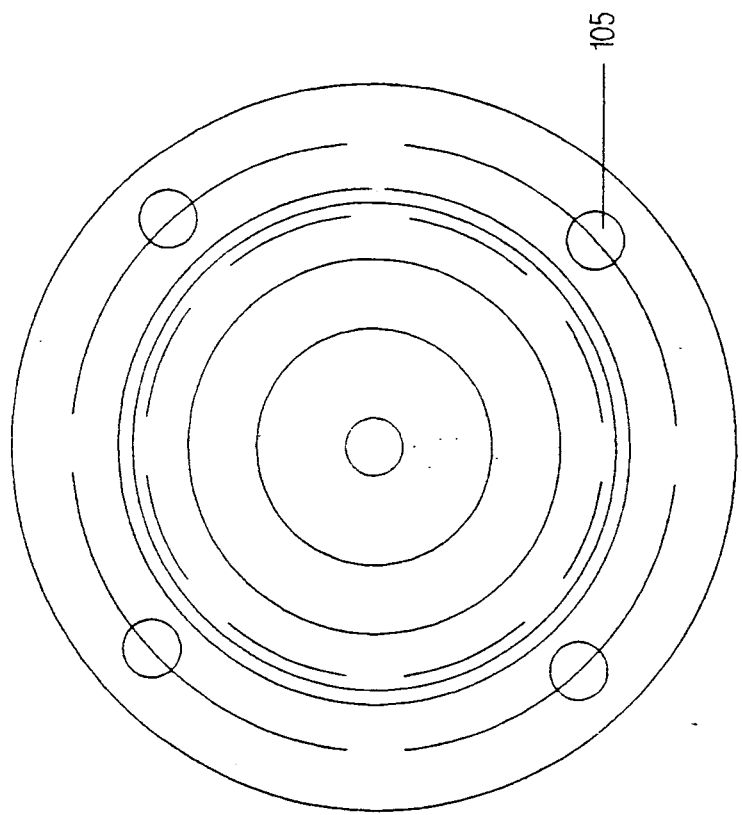
FIG. 7 is a topical internal view of the upper cylinder housing.
Figure 8:
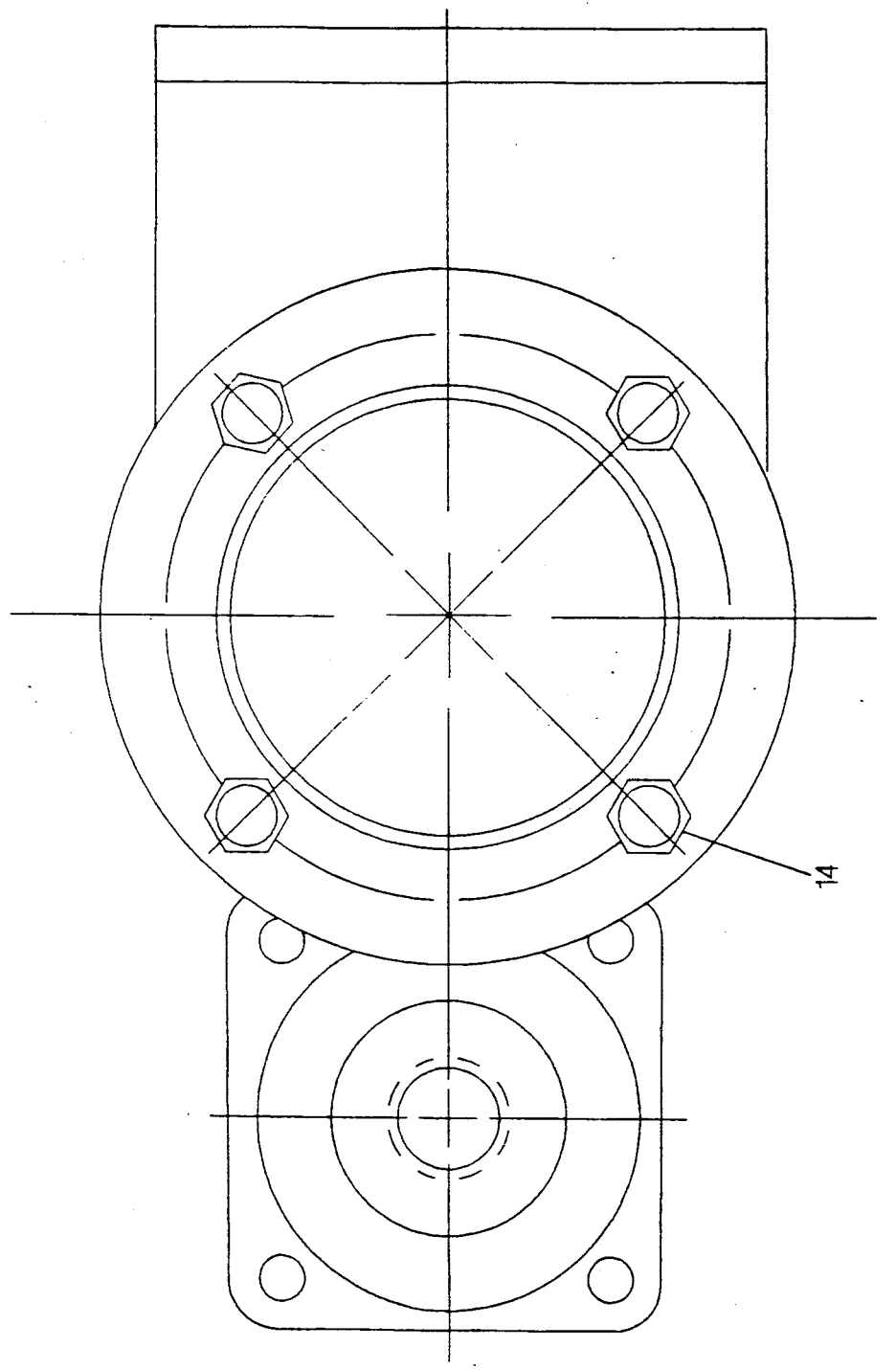
FIG. 8 is a topical external view of the differential pressure regulator valve.

FIG. 3 shows the assembled invention having the upper cylinder housing 1 with four openings 105 shown in FIG. 7 through its flange 100 shown in FIG. 4 that is axially aligned with four openings 106 shown in FIG. 3 through the base housing's flange 101, a 90-degree angle shaped bracket 5 in FIG. 4 having two openings through its horizontal side 102 for aligning with two respective openings of the base housing flange 101 and the upper housing flange 100 and four self-locking type bolts 13 and 14 shown in FIG. 8 and FIG. 4 extending through the said axially aligned openings and fastened with nylon inserted lock nuts 15 securing the bracket 5 to the base housing flange 101 and the same to the upper cylinder housing flange 100.

Figure 5:
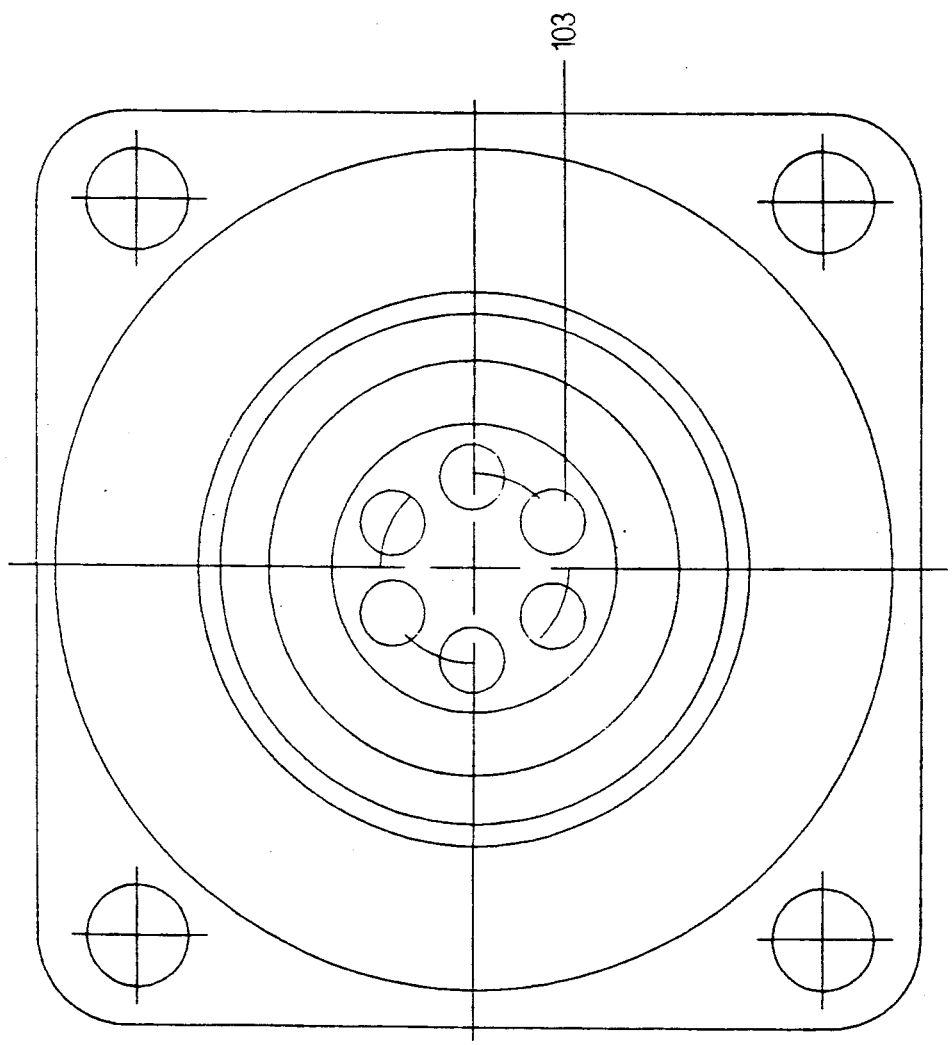
FIG. 5 is a topical view of the quick release cover plate.

The operation of the valve of the invention will be readily understood in the foregoing description. It is understood that the parts of the brake system as shown in FIG. 1 maintain a non-energized position. As the treadle valve 19 is activated, fluid pressure having a pressure differential wave front travels simultaneously to the inlet ports 65 of the inventions 37-41 via conduits 60, 57, 58, 53 and 52. In FIG. 2 as the wave front passes through the diaphragm support screen 68 it is dispersed uniformly over the face of the quick release diaphragm 10 which is the point of fluid pressure shock for each individual braking axle having the effect of causing an increasing pressure differential acting on the flexible quick release diaphragm 10 and the quick release diaphragm 10 forming to the convexity of the quick release cover 9 to seal the cover's exhaust ports 103 as shown in FIG. 5, thereby interrupting communication with the atmosphere. The fluid pressure wave front shock passes through the base protrusion cavity 77 where it is transmitted through the delivery channel 76 and centralizing the wave front shock in the cavity of the base chamber 78 where it depresses the base diaphragm 8 against the piston face 87 depressing the piston 6 axially and energizing the shock absorber member 7. Thus the shock that occurs from the fluid pressure wave front is absorbed therein, and the fluid pressure is thereby instantaneously equalized before it is transmitted to the laterally aligned outlet ports 66 and 67 shown in FIG. 3, FIG. 4 and FIG. 9 and through the conduits 42-51 to the brake actuators 27-36 (see FIG. 9). The delivery channel 76 in FIG. 2 as designed in the valve of the patent is the only method by which the differentials that occur in quick release valves can be isolated from the delivery fluid pressure to the brake actuators.

By instrumenting brake actuators with fluid pressure testing devices it can be demonstrated that momentary fluid pressure differentials occur during the dynamic braking process. As is well known in the art of brake assemblies (not illustrated) the brake actuator has a push rod attached on one end to a rigid metal plate having a resilient diaphragm member which serves to open as a chamber when fluid pressure is applied. The push rod's opposing end is attached to a slack adjuster attached to a cam shaft having an "S" cam design on its other end and serving as a type of fulcrum point for gaining mechanical advantage causing brake shoes to make contact with the rotating brake drum. Inherent in all brake drums are high spots and low spots. During braking, the brake shoes track the drum making contact with the high spots and dropping off to the low spots causing a rocking effect of the "S" cam and in turn causing a back-and-forth jolting of the push rod and thus causing repressurizations of the fluid pressure in the brake actuator. These repressurizations are reflected directly back to the base chamber 78 in FIG. 2 in the invention of the patent. As described in the Spero patent, the reflected actuator pressure differentials from the actuator attached to the standard quick release valve must pass through the standard quick release valve encountering the pressure differentials that exist on the diaphragm within said release valve. It has been noted in the study of Fluid Dynamics that such encounters by opposing differential fluid pressure masses may cause a "dead air" effect or destructive interference and can momentarily prevent the apparatus of the Spero patent from being effective. The design of the differential pressure regulator quick release valve eliminates said encounters as the fluid repressurizations from the actuators do not encounter the pressure differential existing on the diaphragm 10 in FIG. 2 but rather is reflected into the base chamber 78 and absorbed, equalized, and redistributed simultaneously in the same manner as the fluid pressure wave front.

Upon release of the treadle valve 19, it will be readily understood that the fluid pressure differential acting on the diaphragm 10 will be reduced to ambient atmospheric pressure having the effect of relieving the quick release diaphragm's 10 sealing effect on the quick release cover's exhaust ports 103. The higher fluid pressures existing within the invention, the conduits 42-51, and the actuators 27-36 will form the diaphragm 10 against the diaphragm support 68 and the inner surface 75, opening communication with the atmosphere through the cover plate exhaust ports 103 and exhausting the fluid pressure to the atmosphere and thus de-energizing and re-forming the shock absorber 7 to its original frustoconical shape and simultaneously returning the piston 6 to the established position of rest against the retaining ring 17 in FIG. 10 to assure like performance during the next braking cycle. The diaphragm 10 will return to its position of non-flexure (rest) when the said pressures drop to atmospheric pressure.

The Spero apparatus U.S. Pat. No. 4,166,655 is used in conjunction with any of the quick release valves of Horowitz, U.S. Pat. No. 3,093,153, Vorech, U.S. Pat. No. 2,040,580, or Andrews, U.S. Pat. No. 2,718,897, and due to the effects of "isentropic and adiabatic flow" through the various quick release valves and their inherent pressure differentials, there will always exist a calculable imbalance in fluid pressure to the air actuators.

While the invention has been particularly illustrated herein and described with considered preferred detail, it will be readily accepted by those skilled in the art such that various alterations of the embodiments may be made without departing from the spirit of the invention. Be it known that the embodiments of this invention, alterations and modifications falling within the scope of the invention are covered by the claims that follow.

What is claimed is:

1. A differential pressure regulator quick release valve for fluid pressure brake systems having an integral design subject to fluid pressure differentials, contaminants and particulates, having disposed therein a retaining ring, a rigid piston and an elongated, resilient, yieldable, shock absorbing member disposed on a first face of said piston in a walled cylinder and chamber associated therewith said retaining ring disposed for boundary means on a second flange face of said piston and whose function is for consistent, like dampening reactions at a conclusion of compression of said shock absorbing member and said member being returned to an original configuration and said boundary means restricting travel of said piston to a position in said cylinder at completion of depressurization, said cylinder having oil dispersed therein; and as said valve receives fluid pressure having said pressure differentials being delivered to a delivery channel thereof having centralizing means via a housing with a protrusion, an inlet port and said protrusion having a first diaphragm means disposed therein to interrupt communication with cover plate of said protrusion having exhaust ports and said delivery channel centralizing and isolating said fluid pressures and pressure differentials in a base chamber having laterally aligned outlet ports and pressurizations acting on a flexible covering having an inner face and an outer face for acting on said piston's second face and said piston being restricted by said boundary means and said covering having a continuous peripheral portion extending from second diaphragm means thereof, an outer surface of said second means forces an inner surface thereof into contact with a second end such that pressure is transmitted to said piston causing said piston to deform said member into a cylinder housing and delivering pressure directly from a base housing chamber to said outlet ports.

2. A differential pressure regulator quick release valve for fluid pressure brake systems as recited in claim 1 wherein said base housing having said inlet port which is protruding and said axially aligned exhaust ports and disposed therebetween first means having fluid pressure delivered upon said first means and said first means interrupting communication between said protruding inlet port and said laterally aligned outlet ports and allowing for unobstructed pressure differential shock to act upon said first means and said shock being freely delivered directly via said isolating and centralizing means, into said base chamber and said shock acting upon said second diaphragm means transmitting said shock to said rigid piston having dampening means at a position of rest at said boundary means and deforming and energizing said elongated shock absorbing member therein said cylinder chamber and said fluid pressure being delivered through said laterally aligned outlet ports via said conduits to brake actuators and hence pressure differentials generated by said actuators being transmitted via conduits and said outlet ports to said base chamber and acting upon said second means, said actuator pressure differentials shocks being dampened as said second means contacts said dampening means and equalized by said energized deformed elongated member and simultaneously redistributed freely having no interference from said pressure differential at said first means.

3. A differential pressure regulator quick release valve for fluid pressure brake systems as recited in claim 1 having an integral design that is subject to fluid pressure differentials, contaminants and particulates, wherein said boundary means establishes a point of rest of said rigid piston at said completion or conclusion of depressurization, said piston having fluid pressure dampening means, and said boundary means preventing destruction of said second diaphragm means.

4. A differential pressure regulator quick release valve for fluid pressure brake systems as recited in claim 3 wherein said cylinder housing and said base housing with said protrusion having aligned said inlet and exhaust ports, being disposed therein and separated by first means and having isolating and centralizing means, a base chamber, and laterally extending outlet ports, said base chamber being separated from said upper cylinder chamber by a second means and having disposed therein said cylinder chamber, said boundary means, said dampening means, said O-rings, said energized elongated member, said oil, and said first means engaging diaphragm support of said inlet port interrupting communications with said inlet port, said isolating and centralizing means, said base chamber, and said outlet ports so that fluid pressure application contained within said valve, conduits and brake actuators and said fluid pressure reducing to ambient atmospheric pressure through said exhaust ports simultaneously de-energizing said elongated member re-establishing said dampening means at contact with said boundary means.

5. A differential pressure regulator quick release valve for fluid pressure brake systems having an integral design that is subject to fluid pressure differentials, contaminants and particulates as recited in claim 1, wherein said delivery channel having centralizing means for said fluid pressure and pressure differentials delivers the same to an outer surface of said base housing chamber and pressures being dampened by said second diaphragm means contacting and delivering pressure to said dampening means.

6. A differential pressure regulator quick release valve for fluid pressure brake system as recited in claim 1 means is disposed in a concavity of said protrusion housing controls communication between said inlet port and said isolating and centralizing means and for controlling communication between said outlet ports and said isolating and centralizing means and said cover plate's exhaust ports and being imperforate and a diameter portion positioned to interrupt communication between said inlet port and said outlet ports, said outlet ports being connected to opposing brake actuators.

7. A differential pressure regulator quick release valve for fluid pressure brake systems as recited in claim 6 wherein means for interrupting communication with said outlet ports, said isolating and centralizing means and said exhaust ports and for freely delivering fluid pressure through said isolating and centralizing means to said base chamber wherein a pressure wave front shock is centralized within said base chamber and thereby delivering fluid pressure through said outlet ports via conduits to said brake actuators therein returning pressure differentials caused by said brake actuators via conduits and said outlets to said base chamber, said actuator caused differentials being freely dampened by said second diaphragm means pressurizing dampening means.

8. A differential pressure regulator quick release valve for fluid pressure brake systems as recited in claim 6 wherein said second means has an outer surface and having a periphery disposed in an end face of said base housing and a cylinder housing face and whose composition withstands pressures upwards of 1000 psi and outer and inner surfaces being free of rigid bondings eliminating corrosion fragments and enhancing life of said second means.

9. A differential pressure regulator quick release valve for fluid pressure brake systems as recited in claim 6 wherein means for interposition or interposing in said protrusion between said inlet port and said exhaust ports.

10. A differential pressure regulator quick release valve for fluid pressure brake systems as recited in claim 6 therewith a base housing protrusion quick release cover plate that is axially aligned with said inlet port and having means interposed therein and said quick release cover plate having exhaust ports and being fastened to a concavity of said base housing and having a seal ring disposed therein.

11. A differential pressure regulator quick release valve for fluid brake systems as recited in claim 1 wherein said isolating and centralizing means delivers fluid pressure directly to said base chamber of said base housing wherein said fluid pressure and pressure differentials transmit said pressures to said outer surface of said second diaphragm means forcing its said inner surface to make contact with said dampening means that is bounded on a second end flange thereof by said boundary means fixing a position of rest of said dampening means and forcing the same to deform said elongated member into cylinder housing.

12. A differential pressure regulator quick release valve for fluid pressure brake systems as recited in claim 6 wherein an upper cylinder housing has disposed therein said elongated shock absorbing member, said oil, and dampening means having two O-rings disposed in respective semi-circular counterbores containing said oil within upper cylinder chamber and a non-energized position of said dampening means being established by said boundary means thus having consistent reactions to fluid pressure and preventing destruction of said second diaphragm means.

13. A differential pressure regulator quick release valve for fluid pressure brake systems as recited in claim 1, said valve has an integrally determined relationship in a plurality of brake actuators having said inlet port which is protruding connected by a conduit to a relay valve outlet port and said outlet port supplying fluid pressure via a conduit to said inlet port and said first diaphragm means interrupting communication between said laterally placed outlet ports, said isolating and centralizing means, said exhaust port and said first means communicating said fluid pressure through said centralizing means to said outlet ports via conduits to two said brake actuators which are opposing and upon reduction of fluid pressure to ambient atmospheric pressure first means to interrupt communication between said inlet port and said laterally placed outlet ports and permitting fluid pressure volumes within said opposed actuators, said conduits and said base chamber to rapidly simultaneously reduce fluid volume to ambient atmospheric pressure through said exhaust port of said valve.

14. A differential pressure regulator quick release valve for fluid pressure brake systems as recited in claim 1 wherein said valve has isolating and centralizing means for directing fluid pressure shock to base chamber.

15. A differential pressure regulator quick release valve for fluid pressure brake systems as recited in claim 1 wherein said upper cylinder has said boundary means establishing a point of rest of said dampening means.

16. A differential pressure regulator quick release valve for fluid pressure brake systems as recited in claim 1 oil being disposed in an upper cylinder chamber of said cylinder housing and oil having a minimal compressibility and said cylinder chamber having an amount of ambient air disposed therein, and said elongated member in an energized state being deformed into said cylinder chamber and oil becoming aerated oil gaining compressibility and being essential to absorbing shock from fluid pressures acting upon said second means and said dampening means.

* * * * *